United States Patent
Kato et al.

Patent Number: 5,691,615
Date of Patent: Nov. 25, 1997

[54] ADAPTIVE PI CONTROL METHOD

[75] Inventors: Tetsuaki Kato, Oshino-mura; Osamu Yoshida, Kanazawa; Masaru Nakamura; Soichi Arita, both of Oshino-mura, all of Japan

[73] Assignee: Fanuc Ltd., Yamanashi, Japan

[21] Appl. No.: 204,313

[22] PCT Filed: Jul. 16, 1993

[86] PCT No.: PCT/JP93/00995

§ 371 Date: Mar. 14, 1994

§ 102(e) Date: Mar. 14, 1994

[87] PCT Pub. No.: WO94/02989

PCT Pub. Date: Feb. 3, 1994

[30] Foreign Application Priority Data

Jul. 17, 1992 [JP] Japan ................... 4-212268
Oct. 28, 1992 [JP] Japan ................... 4-311142

[51] Int. Cl.$^6$ .............................. H02M 1/12
[52] U.S. Cl. .................. 318/609; 318/432; 388/809; 364/161
[58] Field of Search .................. 318/489, 610, 318/568.16, 630, 609, 568.1, 568.11, 561, 615, 815, 432, 632; 388/809, 812, 813, 814, 815; 364/157, 148, 161, 166, 162

[56] References Cited

U.S. PATENT DOCUMENTS

| | | | |
|---|---|---|---|
| 3,998,409 | 12/1976 | Pistiner | 318/489 |
| 4,540,923 | 9/1985 | Kade et al. | |
| 4,862,343 | 8/1989 | Nomura et al. | 318/802 |
| 5,157,597 | 10/1992 | Iwashita | 318/561 |
| 5,216,342 | 6/1993 | Torii et al. | 318/568.1 |
| 5,263,113 | 11/1993 | Naitoh et al. | 318/432 |
| 5,304,906 | 4/1994 | Arita et al. | 318/568.16 |
| 5,444,341 | 8/1995 | Kneifel, II et al. | 318/432 |

FOREIGN PATENT DOCUMENTS

| | | |
|---|---|---|
| A-59 220806 | 12/1984 | Japan. |
| 61-132088 | 6/1986 | Japan. |
| 62-233081 | 10/1987 | Japan. |
| 63-154085 | 6/1988 | Japan. |
| 63-287377 | 11/1988 | Japan. |
| 64-47290 | 2/1989 | Japan. |
| 2-30487 | 1/1990 | Japan. |
| A-02 010411 | 1/1990 | Japan. |

*Primary Examiner*—John W. Cabeca
*Attorney, Agent, or Firm*—Staas & Halsey

[57] ABSTRACT

A method of obtaining a very robust adaptive PI control method irrespective of fluctuation of parameters of a control object, wherein (speed command r−actual speed y) is used as a state variable Suf. Estimated values J*, A*, Gr*, and C* of inertia, coefficient of dynamic friction, gravitational disturbance depending on a robot angle, and Coulomb's friction, respectively, are obtained and a torque command τ is obtained in accordance with the following equation so as to cancel an error between each of the estimated values and its actual value to zero.

$$\tau = K2 \cdot Suf + (K1/s) \cdot Suf + J^* \cdot r' + A^* \cdot y + Gr^* \cdot \sin\theta + Cf^* + \tau 1.$$

The first and second terms of the right side of the above equation are identical with a torque command obtained by the PI control. Furthermore, r' represents an acceleration of command; θ represents a rotational angle of a robot arm; and τ1 represents a switching input corresponding to miscellaneous disturbance. As an error between each of the estimated values and its actual value becomes zero, a relationship of speed command r=actual speed y is obtained and therefore an adaptive PI control of a transfer function "1" is obtained.

9 Claims, 3 Drawing Sheets

ADAPTIVE PI CONTROL METHOD

BACKGROUND OF THE INVENTION

1. Field of the Invention

The present invention relates to a motor control method for driving a control object, such as a robot or a machine tool, and more particularly to a robust adaptive PI (proportional-plus-integral) control method which executes adaptation of parameters, such as inertia, coefficient of dynamic friction, gravitational disturbance, or Coulomb's friction, so as to stabilize the characteristics of the control object against variation of these parameters.

2. Description of the Related Art

The control of a machine driven by a servomotor, such as a robot or a machine tool, is generally performed by a P control (proportional control) for position control and an PI control (proportional-plus-integral control) for speed control. FIG. 2 is a block diagram showing a motor speed control system using a PI control method. In this drawing, a command speed r is subtracted by an actual motor speed y to obtain a speed deviation, which is multiplied by a proportional gain K2 in a proportional element 1. On the other hand, the speed deviation is integrated in an integral element 2 and multiplied by a integral gain K1 therein. An output of the proportional element 1 is added to an output of the integral element 2 to obtain a torque command Tcmd, which is thereafter outputted to a motor 7, i.e. a control object, so as to drive the motor 7. In this case, the gains K1 and K2 for the PI control are normally fixed at predetermined constant values.

However, when values of proportional gains K1 and K2 are constant, if parameters such as inertia, dynamic friction, gravitational disturbance or Coulomb's friction of the machine or the like as a control object change, then control characteristics may also change, thereby lowering control efficiency.

For example, as shown in FIG. 3, in the case where the integral gain K1 and the proportional gain K2 are fixed values and the control object has a certain inertia, the gain and phase of an entire control system being G and f respectively with respect to frequency, if the inertia of the control object increases to a 5 times larger value, then the gain and phase change from G and f to G' and f', respectively, thereby causing the change of characteristic of the entire control system. Thus, in the conventional control system, the integral gain K1 and proportional gain K2 must be selected so as to always stabilize the control system against possible variations of parameters within a predetermined range.

SUMMARY OF THE INVENTION

Accordingly, an object of the present invention is to provide a robust adaptive proportional-plus-integral control (PI control) method capable of stabilizing the characteristics of a control system against fluctuation of the parameters, such as inertia, coefficient of dynamic friction, gravitational disturbance, which may raise a problem in the control of a motor.

In order to accomplish the above purpose, a first aspect of the present invention provides an adaptive proportional-plus-integral control method for a motor control system including a proportional-plus-integral loop as a speed loop, comprising steps of:

defining, a speed deviation obtained by subtracting an actual motor speed from a motor speed command, as a state variable, for the purpose of equalizing the actual motor speed to the motor speed command; and determining an actual torque command to be given to the motor on the basis of an equation of motion of a control object, so as to converge said state variable at zero and converge estimated values of parameters to be adapted at their true values, said parameters including inertia, coefficient of dynamic friction, gravitational disturbance, and Coulomb's friction.

Furthermore, a second aspect of the present invention provides an adaptive PI control method for a motor control system including a proportional-plus-integral loop as a speed loop, comprising steps of:

defining, as a state variable, a speed deviation obtained by subtracting an actual motor speed from a speed command;

estimating values of various parameters which will affect characteristics of a control object to be controlled by a motor, using said state variable;

obtaining a torque correction value so as to cancel the error between each of said estimated values and its actual value; and adding said torque correction value to the torque command obtained through a processing of said proportional-plus-integral loop, thereby producing a torque command to be supplied to said motor for driving.

It is preferable that said various parameters include inertia, coefficient of dynamic friction, and gravitational disturbance of said control object. Coulomb's friction is also included.

It is further preferable that the estimation of said gravitational disturbance in said various parameters is performed by estimating a coefficient of a gravitational disturbance which will determine a disturbance depending on a position of said control object and constant gravitational disturbances other than said coefficient of gravitational disturbance.

It is still further preferable that said control object is a robot, and the estimation of said gravitational disturbance is performed by estimating a coefficient of gravitational disturbance relating to an angle of the arm which will receive the greatest effect of gravity, disturbances determined by angles of another arms other than the above arm, and a constant gravitational disturbance.

Moreover, a third aspect of the present invention provides an adaptive PI control method for a motor control system including a proportional-plus-integral loop as a speed loop, comprising steps of:

determining a torque command τ to be supplied to a motor in accordance with the following equation on the basis of an equation of motion, $$\tau = K2 \cdot Suf + J^* \cdot r' + A^* \cdot y + Gr^* \cdot \sin\theta + Fr^* + Cf^* + \tau l$$

and; obtaining terms of K2·Suf and of Fr* of the right side of the above equation as proportional and integral terms of an ordinary proportional-plus-integrate control.

Where, in the above equation; K2 represents a proportional constant; Suf represents a speed deviation obtained by subtracting an actual motor speed from a speed command; r' represents a differential of the speed command with respect to time, i.e. a command acceleration; J*, A*, Gr*, Fr*, and Cf* represent estimated values of inertia, coefficient of dynamic friction, coefficient of gravitational disturbance, constant gravitational disturbance, and Coulomb's friction, respectively; and θ represents a rotational angle of a robot arm which will give the greatest effect on the gravitational disturbance; furthermore the estimated value J* of the inertia in the above equation is obtained by integrating the value obtained by multiplying the speed deviation Suf by the command acceleration r' and a reciprocal (1/α) of an adjusting parameter a determining an adaptive speed with respect to time;

the estimated value A* of the coefficient of dynamic friction is obtained by integrating the value obtained by multiplying the speed deviation Suf by the actual motor speed y and a reciprocal (1/β) of an adjusting parameter β with respect to time;

the estimated value Gr* of the coefficient of gravitational disturbance is obtained by integrating the value obtained by multiplying the speed deviation Suf by sin θ corresponding to a rotational angle θ of said arm and a reciprocal (1/γ) of an adjusting parameter γ with respect to time;

the estimated value Fr* of the constant gravitational disturbance is obtained by integrating the value obtained by multiplying the speed deviation Suf by a reciprocal (1/δ) of an adjusting parameter δ with respect to time;

the estimated value Cf* of the Coulomb's friction is obtained by integrating the value obtained by multiplying the speed deviation Suf by a reciprocal (1/ε) of an adjusting parameter ε with respect to time; and the switching input τ1 is determined to be a maximum value of gravitational disturbances given by rotational angles of arms other than said robot arm which will give the greatest effect on said gravitational disturbance when said speed deviation Suf is zero or positive, and is determined to be a minimum value of the above gravitational disturbances when said speed deviation Suf is negative.

The switching input τ1 can be always zero depending on a robot to be used.

The adaptive PI control method of the present invention is carried out by taking account of fluctuation of parameters, such as inertia, coefficient of dynamic friction, gravitational disturbance, and Coulomb's friction, which will raise problem to the characteristics of a control object. Therefore, the characteristics of the control system is stable against variations of these parameters; thus, a very robust PI (proportional-plus-integral) control is realized. Especially, the present invention will be effectively applied to the control object, such as a robot, whose inertia or gravitational disturbance varies depending on its arm position.

DETAILED DESCRIPTION OF THE PREFERRED EMBODIMENTS

Figure 1:
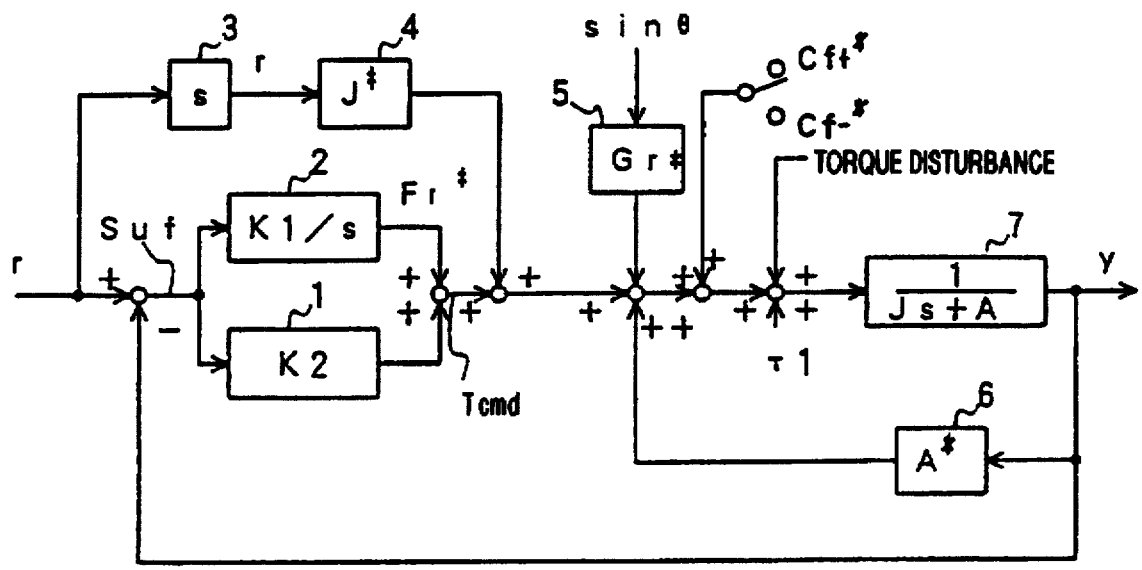
FIG. 1 is a block diagram showing a motor speed control system using an adaptive PI control method in accordance with one embodiment of the present invention.
Figure 2:
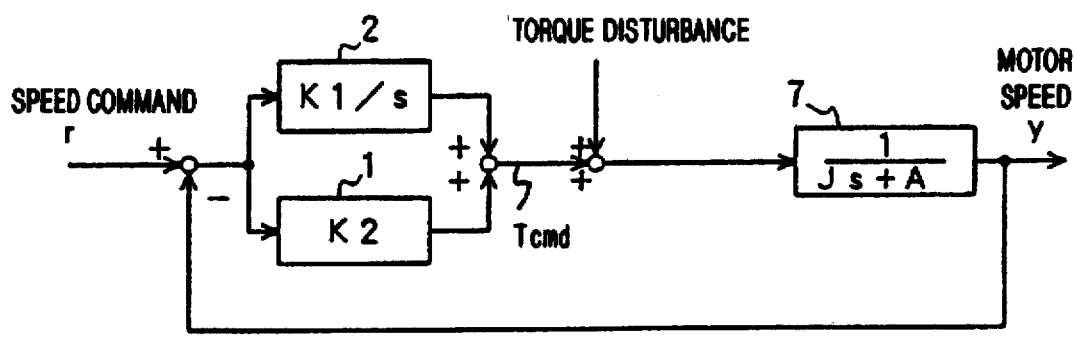
FIG. 2 is a block diagram showing a motor speed control system using a conventional PI control method.
Figure 3:
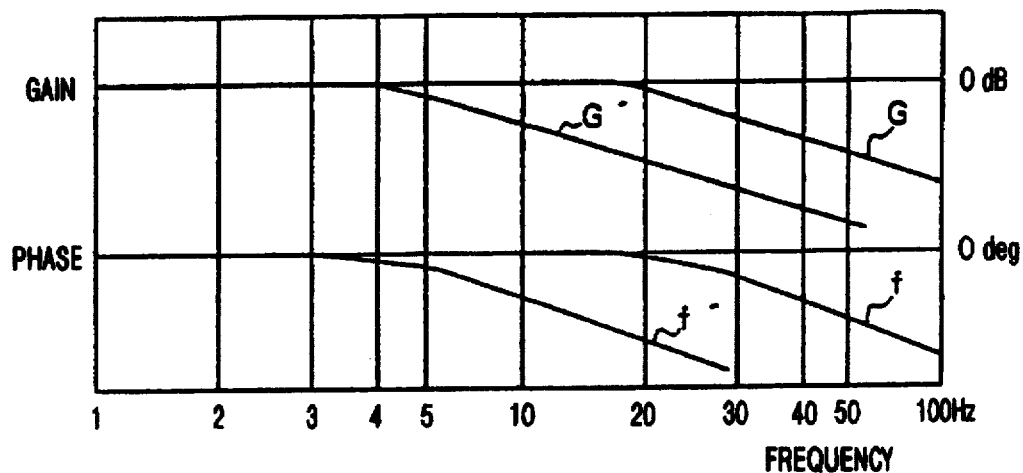
FIG. 3 is a graph illustrating variation of the characteristics of a control system, which is seen when the inertia of a control object changes varied by the conventional PI speed control method.

One embodiment of the present invention will be described hereinafter. In this embodiment, a control object is a robot.

First of all, a state variable Suf is defined by the following equation (1). Also, an equation of motion for a robot as a control object is expressed by the following equation (2).

$$Suf = r - y \quad (1)$$

$$\tau = J \cdot y' + A \cdot y + Gr \cdot \sin\theta + Fr + Cf + Dis \quad (2)$$

In the above equations (1) and (2), r represents a speed command supplied to a motor and y represents an actual motor speed. The state variable Suf is accordingly equivalent to a speed deviation. Furthermore, τ represents a motor torque, and y' represents a differential of the motor actual speed with respect to time. Namely, y' is equal to an acceleration of the motor. Hereinafter, a superscript "'" on the right shoulder of a letter denotes a differential of a variable represented by this letter with respect to time. Moreover, J represents an inertia; A represents a coefficient of dynamic friction; Gr represents a coefficient of gravitational disturbance with respect to a robot arm angle; θ represents a rotational angle of a robot arm giving the largest affection to the gravitational disturbance; Fr represents a constant gravitational disturbance; Cf represents a Coulomb's friction; and Dis represents miscellaneous disturbance, such as a gravitational disturbance given by a rotational angle of another robot arm.

Furthermore, the torque command τ supplied to the motor is defined by the following equation (3).

$$\tau = K2 Suf + J^* \cdot r' + A^* \cdot y + Gr^* \cdot \sin\theta + Fr^* + Cf^* \tau 1 \quad (3)$$

In the above equation (3), K2 represents a constant determining a converging speed which will be described later; J* represents an estimated value of the inertia term; A* represents an estimated value of the coefficient of dynamic friction; Gr* represents an estimated value of the coefficient of gravitational disturbance; Fr* represents an estimated value of the constant gravitational disturbance; and Cf* represents an estimated value of Coulomb's friction whose polarity varies depending on positive or negative of the speed y although its absolute value remains at the same value. Namely, Cf*=0 when y=0, Cf*=a predetermined positive estimated value Cf+* when y>0

Cf*=a predetermined negative estimated value Cf−* when y<0

Furthermore, τ1 represents a switching input.

Next, Liapunov function candidate V is defined by the following equation (4).

$$V = (\tfrac{1}{2}) J \cdot Suf^2 + (\tfrac{1}{2}) \alpha \cdot Jbar^2 + (\tfrac{1}{2}) \beta \cdot Abar^2 + (\tfrac{1}{2}) \gamma \cdot Grbar^2 + (\tfrac{1}{2}) \delta \cdot Frbar^2 + (\tfrac{1}{2}) \delta \cdot Cfbar^2 \quad (4)$$

Where α, β, γ, δ and ε represent positive adjusting parameters determining an adaptive speed. Jbar, Abar, Grbar, Frbar, and Cfbar represent an estimation error of the inertia element, an estimation error of the coefficient of dynamic friction, an estimation error of the coefficient of the gravitational disturbance, an estimation error of the constant gravitational disturbance, and an estimation error of the Coulomb' friction, respectively, each being expressed in the following equation (5).

$Jbar=J-J^*$ $Abar=A-A^*$ $Grbar=Gr-Gr^*$ $Frbar=Fr-Fr^*$ $Cfbar=Cf-Cf^*$ (5)

The above Liapunov function candidate V is a function whose value is always positive or "0" (that is, minimum value). Therefore, if the torque τ to be supplied to a motor is determined in such a manner that the differential value V' of the Liapunov function candidate V is always negative (monotone reduction), the Liapunov function candidate V will converge at the minimum value "0" That is, Suf=0,
Jbar=0,
Abar=0,
Grbar=0,
Frbar=0,
Cfbar=0.

Since a relationship Suf=0 means that the command speed (r) is equal to the actual speed (y), the transfer function of entire control system becomes 1. Thus, the response does not depend on the parameters of the control object (inertia, coefficient of dynamic friction, gravitational disturbance, constant gravitational disturbance, Coulomb's friction, and miscellaneous disturbance). And each of the estimation errors (Jbar, Abar, Grbar, Frbar, Cfbar) becomes zero accordingly; therefore the estimated values converge at true values.

If both sides of the above equation (4) are differentiated, the following equation will be obtained.

$V'=J\cdot Suf\cdot Suf'+\alpha\cdot Jbar\cdot Jbar'+\beta\cdot Abar\cdot Abar'+\gamma Grbar\cdot Grbar'+\delta\cdot Frbar\cdot Frbar'+\epsilon\cdot Cfbar\cdot Cfbar'$ (6)

If both sides of the equation (1) are differentiated, the following equation will be obtained.

$Suf'=r'-y'$ (7)

From the equation (2), y' is obtained as follows.

$y'=(\tau/J)-(A\cdot y/J)-(Gr\cdot\sin\theta+Fr+Cfy)/J-(Dis/J)$ (8)

If the equation (8) is substituted into the equation (7), the following equation is derived.

$Suf'=r'+(A\cdot y/J)+(Gr\sin\theta+Fr+Cfy)/J+(Dis/J)-(\tau/J)$ (9)

Substituting the equation (9) into the equation (6), V' is obtained as follows.

$V'=Suf(J\cdot r'+A\cdot y+Gr\sin\theta+Fr+Cf+Dis-\tau)+Jbar\cdot Jbar'+\beta Abar\cdot Abar'+\gamma Grbar\cdot Grbar'+\delta Frbar\cdot Frbar'+\epsilon\cdot Cfbar\cdot Cfbar'$ (10)

Substituting the equation (3) into the equation (10) and rearranging it, V' is expressed by the following equation (11).

$V'=-K2Suf^2+Jbar(Suf\cdot r'+\alpha Jbar')+Abar(Suf\cdot y+\beta\cdot Abar')+Grbar(Suf\cdot\sin\theta+\gamma\cdot Grbar')+Frbar(Suf+\delta\cdot Frbar')+Cfbar(Suf+\epsilon\cdot Cfbar')+Suf\cdot(Dis-\tau1)$ (11)

The first term of the right side of the equation 11 is always negative. Therefore, by equalizing each of the second to six terms of the right side to zero and selecting the value of the switching input τ1 so as to render the seventh term always negative, the differential value V' of the above Liapunov function candidate always becomes negative.

First of all, let us equalize the value of the second term of the equation (11) to zero.

$Jbar(Suf\cdot r'+\alpha\cdot Jbar')=0$ (12)

To satisfy the equation (12) any time, the following equation (13) needs to be established.

$Suf\cdot r'+\alpha\cdot Jbar'=0$

Accordingly, $Jbar'=-(1/\alpha)Suf\cdot r'$ (13)

If it is assumed that variation of the inertia J is very small and therefore its differential value J' is zero (J'=0), the above equation (5) Jbar=J-J* gives Jbar'=-J*'.

Accordingly, from the above equation and the equation (13), the following equation is obtained.

$J^{*'}=(1/\alpha)Suf\cdot r'$ (14)

Therefore, if the estimated inertia J* is varied on the basis of the state variable Suf and the differential value of the command speed (acceleration) r' so as to establish the above equation (14), the second term of the right side of the equation (11) becomes zero.

In the same manner, assuming that variations of the coefficient of dynamic friction, coefficient of gravitational disturbance, constant gravitational disturbance, and Coulomb's friction are very small and, therefore, their differential values become zero, that is;

A'=0
Gr'=0,
Fr'=0, and
Cf=0.

and also assuming that each of the third to sixth terms of the right side of the equation (11) is zero, the following equations will be established.

$A^{*'}=(1/\beta)Suf\cdot y$ (15)

$Gr^{*'}=(1/\gamma)Suf\cdot\sin\theta$ (16)

$Fr^{*'}=(1/\delta)Suf$ (17)

$Cf+^{*'}=(1/\epsilon)Suf$ only when y>0 (18)

$Cf-^{*'}=(1/\epsilon)Suf$ only when y<0 (19)

Therefore, if changing the value A* of the coefficient of dynamic friction, the estimated value Gr* of the coefficient of gravitational disturbance, the estimated value Fr* of the constant gravitational disturbance, the estimated values Cf+* and Cf-* of the Coulomb's friction respectively corresponding to positive and negative actual speed y respectively so as to satisfy the above equations (15) to (19), then the third to sixth terms of the right side of the equation (11) becomes zero.

In order to make negative the seventh term of the right side of the equation (11), that is, in order to establish the following equation, $Suf(Dis-\tau1)<0$ (20)

a relationship τ1>Dis needs to be satisfied when Suf≧0. Therefore, the switching input τ1 should be equalized to the maximum value Dismax of the above-described miscellaneous disturbance Dis (τ1=Dismax).

On the other hand, when Suf<0, a relationship τ1<Dis needs to be satisfied. Therefore, the switching input τ1 should be equalized to the minimum value Dismin of the above-described miscellaneous disturbance Dis (τ1=Dismin).

Therefore, if, by integrating the left sides of the equations (14) to (19) with respect to time, the estimated values J*, A*, Gr *, Fr*, Cf+*, and Cf−* are obtained, and further the switching input τ1 is selected, in view of the equation (20), to Dismin in accordance with the sign of Suf, a torque command τ to the motor will be obtained based on the equation (3). That is, when controlling the motor with the torque command obtained in that way, the above equations (14) to (20) are established and a differential value of the Liapunov function candidate V always becomes negative. Consequently, the Liapunov function candidate V converges on zero (the minimum value), starting from a positive value. The state variable Suf and the estimated values of various parameters also become zero (Suf=0, Jbar=0, Abar=0, Grbar=0, Frbar=0, Cfbar=0).

Especially, when 1/δ=K1, the above equation (17) gives the following equation (21).

$$Fr^* = (K1/S)Suf \quad (21)$$

The right side of the above equation means integrating Suf=r−y, that is, speed deviation, and multiply a constant K1. This processing is the same as that of the integral element 2 in the speed loop processing based on the conventional PI control.

Accordingly, the torque command τ to be obtained by the equation (3) is rearranged as follows.

$$\tau = K2 \cdot Suf + (K1/s) \cdot Suf + J^* \cdot r' + A^* \cdot y + Gr^* \cdot \sin\theta + Cf^* + \tau 1 \quad (22)$$

In the above equation (22), the state variable Suf is equal to (r−y), i.e. the speed deviation. Therefore, {K2·Suf+(K1/s)·Suf} is equal to the torque command Tcmd obtained from the conventional PI control. Thus, the equation (22) is rewritten into the following equation (23).

$$\tau = Tcmd + J^* \cdot r' + A^* \cdot y + Gr^* \cdot \sin\theta + Cf^* + \tau 1 \quad (23)$$

where, Cf* is either Cf+* or Cf−*, which is obtained by integrating the differential value Cf*' in each of the equations (18) and (19) according to positive and negative of the actual speed y. Therefore, selection of Cf+* or Cf−* depends upon the sign of the actual speed y. When the actual speed y is zero, Cf* becomes zero.

If the relationship of the above equation (22) (also the relationship of the equation (23)), is expressed as a block diagram, it will be illustrated as shown in FIG. 1. In the drawing, a reference numeral 1 represents an term (proportion term) in which a speed deviation (state variable) Suf is multiplied by the constant K2. A reference numeral 2 represents a term (integral term) in which this Suf is integrated and multiplied by the constant K2. These terms 1 and 2 correspond to proportional and integral terms of the conventional PI control. And, adding a value obtained by multiplying Suf (=r−y) by the constant K2 of the term 1 and a value obtained by integrating Suf and multiplying it by the constant K2 leads to the calculation of the first and second terms of the right side of the equation (22), that is, to obtaining the torque command Tcmd of the first term of the right side of the equation (23). Moreover, integrating Suf and multiplying the constant K1 leads to calculating the right side of the equation (21), that is, to obtaining Fr* of the left side.

As shown in FIG. 1, a reference numeral 3 represents a term in which a command speed r is differentiated for obtaining an command acceleration r'. A reference numeral 4 represents a term in which this command acceleration r' is multiplied by the estimated inertia J*, that is, a term for obtaining the value of the second term of the right side of the equation (23). A reference numeral 5 represents a term of the estimated value Gr* of the coefficient of gravitational disturbance with respect to the robot arm angle θ, that is, a term for obtaining a gravitational disturbance by multiplying this estimation value Gr* by sin θ which corresponds to the robot arm angle θ, in other words, a term for obtaining the fourth term of the right side of the equation (23). A reference numeral 6 is a term in which the estimated value A* of the coefficient of dynamic friction is multiplied by the motor actual speed y to obtain the gravitational disturbance, that is, a term for obtaining the third term of the equation (23).

The sum total obtained by adding all of the outputs of the above-mentioned terms 1, 2, 4, 5 and 6, the positive Coulomb's friction or the negative Coulomb's friction based on positive or negative of the actual speed y, and the switching input τ1, is outputted to the motor as a torque command τ to drive the motor.

Figure 4:
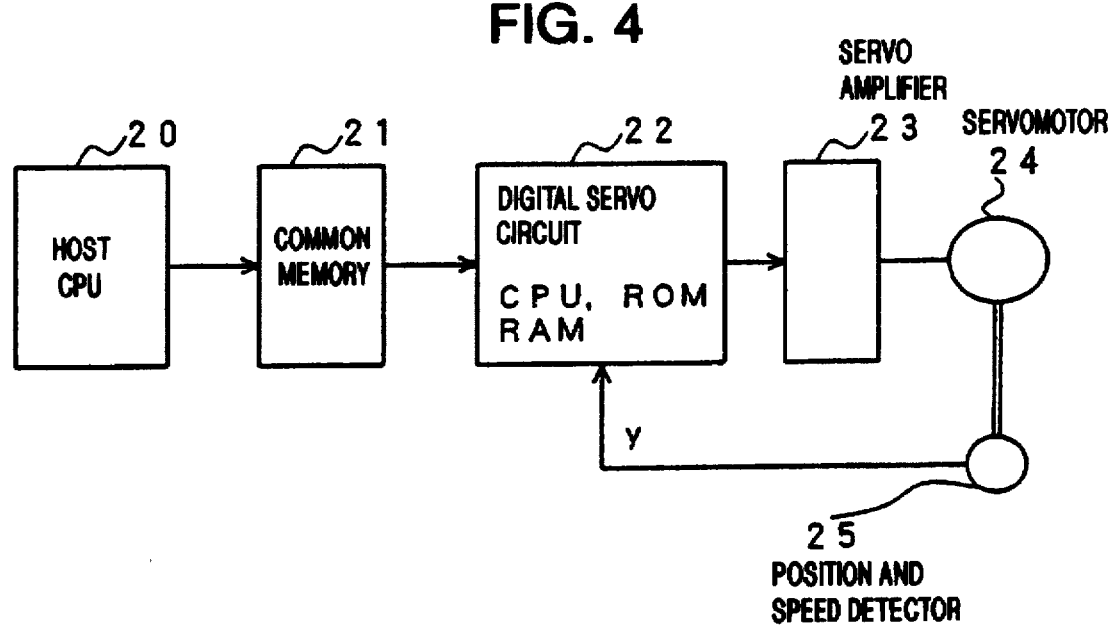
FIG. 4 is a block diagram showing a servomotor control system of a robot in accordance with the one embodiment of the present invention.

FIG. 4 is a block diagram in accordance with one embodiment of the present invention, which shows an essential part of the control system of a servomotor which drives a robot. In FIG. 4, a reference numeral 20 represents a host processor controlling the control object (i.e. the robot). This host processor 20 distributes a position command to each axis of the control object. A reference numeral 21 represents a shared memory which intermediates between the host processor 20 and a digital servo circuit 22 for transmission of information. The data, such as the position command and the like, are therefore transmitted, after being written in the host processor 20, from the host processor 20 to a processor of the digital servo circuit 22 through the shared memory 21. On the other hand, the alarm information and the like written in the processor of the digital servo circuit 22 are transmitted to the host processor 20 through the shared memory 21. A reference numeral 22 represents a digital servo circuit constituted by a digital signal processor or the like, which normally comprises a processor, a ROM and a RAM. This digital servo circuit 22 controls servomotors each actuating an associated axis of the robot; that is, the digital servo circuit 22 executes a servomotor control procedure of the adaptive PI control of the present invention. A reference numeral 23 is a servo amplifier constituted by a transistor inverter and others. A reference numeral 24 represents a servomotor. Furthermore, a reference numeral 25 represents a position and speed detector which detects the position and speed of the servomotor 24. Thus detected position and speed y are fed back to the digital servo circuit. The drawing shows the servo amplifier 23 and the servomotor 24 for only one axis.

Figure 5:
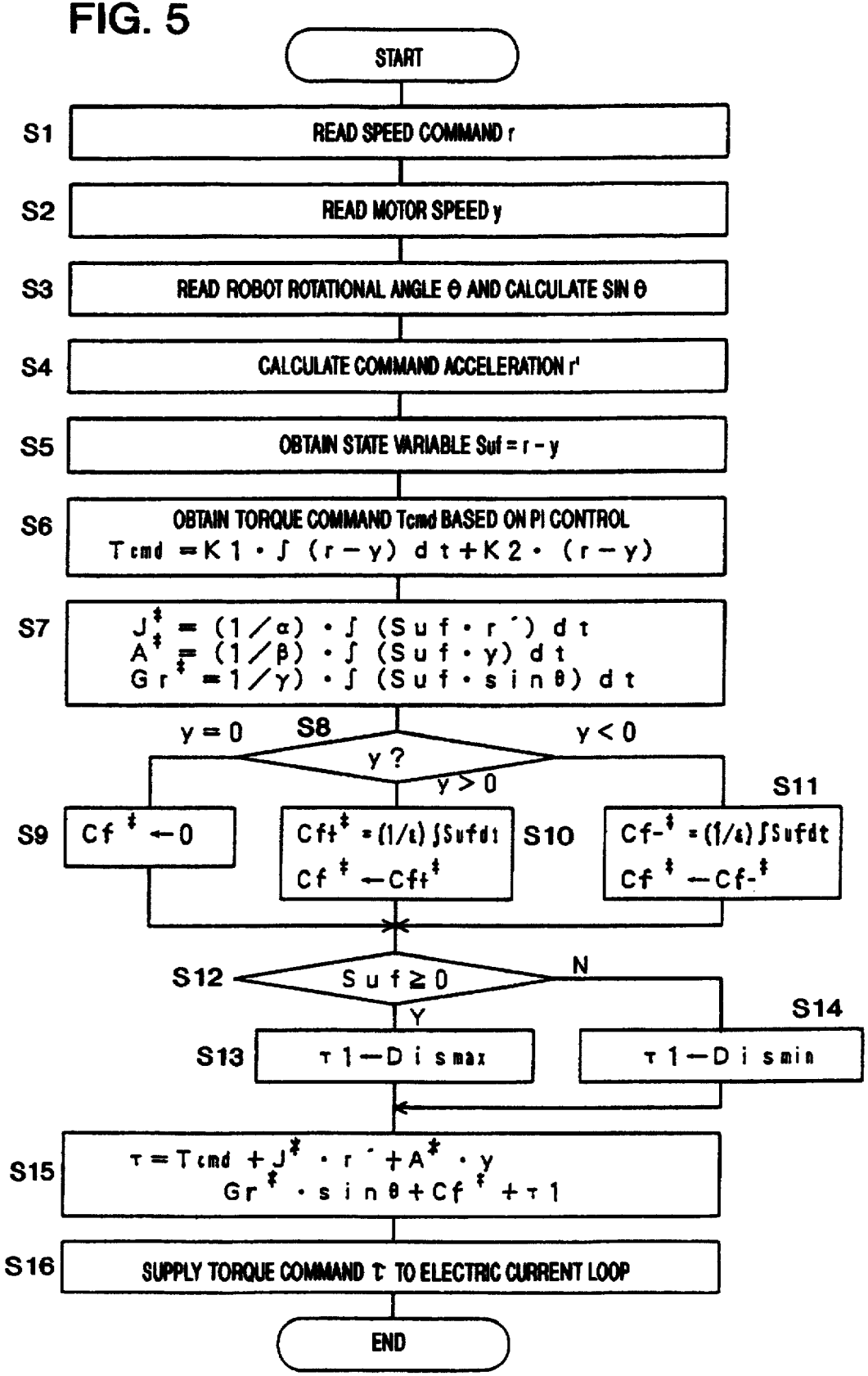
FIG. 5 is a flowchart showing an essential part of the control procedure executed by a processor in a digital servo circuit in the embodiment of the present invention.

FIG. 5 shows a flowchart showing a servomotor control procedure of the present invention, which is executed in the processor of the digital servo circuit 22. This processor executes the procedure shown in FIG. 5 at predetermined cycles.

First of all, the digital servo circuit 22 memorizes in its memory several constants necessary to execute the servomotor control procedure of the adaptive PI control, such as the proportional gain K2, the integral gain K1(=1/δ), the estimated maximum and minimum values Dismax and Dismin of miscellaneous disturbance, and adjusting parameters α, β, γ and ε.

Upon start of operation of the control object (robot), the host processor 20 distributes a position command to each axis of the control object. The processor of the digital servo circuit 22 reads out the position command from the shared memory 21 as well as a position feedback amount generated from a pulse coder 16, and executes position loop processing in the same manner as in the conventional system to obtain the speed command r.

Next, the processor of the digital servo circuit initiates the procedure shown in FIG. 5. The processor first reads the speed command r obtained by the position loop processing, and then reads an actual speed y of the motor 24 detected by the position and speed detector 24 (Steps S1 and S2). Thereafter, the processor reads a specific rotational angle θ of a robot arm sent from the host processor 20 to the digital servo circuit 22 through the shared memory 21, at which gravity gives the greatest influence on the robot. Based on this rotational angle θ, the value of sin θ is calculated (Step S3). Subsequently, the command acceleration r' is calculated by differentiating the command r (i.e. by subtracting a speed command r of a preceding cycle from that of a present cycle and dividing that subtracted value by a cycle time). And the speed deviation is obtained as the state variable Suf by subtracting the actual speed y from the speed command r (Steps S4 and S5). Next, PI control procedure is carried out in the same manner as in the conventional system, in order to obtain the torque command Tcmd based on the PI control.

Next, processings of integration of the equations (14), (15) and (16) are carried out based on the adaptive processing of each parameters to obtain the estimated values of parameter J* of inertia, A* of the dynamic friction, and Gr* of the coefficient of gravitational disturbance, respectively (Step S7).

That is, a register which stores the estimated value J* of inertia accumulates the value obtained by multiplying the positional deviation Suf obtained in the step S5 by the command acceleration r' obtained in the step S4 and a reciprocal 1/α of the adjusting parameter α to obtain the estimated value J* of inertia. A register which stores the estimated value A* of the coefficient of dynamic friction accumulates the value obtained by multiplying the positional deviation Suf obtained in the step S5 by the actual speed y and the reciprocal 1/β of the adjusting parameter β to obtain the estimated value A* of the coefficient of dynamic friction. Furthermore a register which stores the estimated value Gr* of the coefficient of gravitational disturbance accumulates the value obtained by multiplying the positional deviation Suf by sin θ obtained in the step S3 and the reciprocal 1/γ of the adjusting parameter γ to obtain the estimated value Gr* of the coefficient of gravitational disturbance.

Subsequently, a judgement is made as to whether or not the motor speed y read in the step S2 is zero or "positive" or "negative" (Step S8). When the speed y is zero, a register storing the estimated value Cf* of Coulomb's friction is set to zero. When the speed y is positive, a register storing the estimated value Cf+* of the positive Coulomb's friction accumulates the value obtained by multiplying the positional deviation Suf by the reciprocal of the adjusting parameter ε to obtain the estimated value Cf+* of the positive Coulomb's friction. Then the obtained estimated value Cf+* of the positive Coulomb's friction is set in the register storing the estimated value Cf* of the Coulomb's friction. On the other hand, when the speed y is negative, a register storing the estimated value Cf-* of the negative Coulomb's friction accumulates the value obtained by the positional deviation Suf by the reciprocal of the adjusting parameter ε to obtain the estimated value Cf-* of the negative Coulomb's friction. Then the obtained estimated value Cf-* of the negative Coulomb's friction is set in the register storing the estimated value Cf* of the Coulomb's friction (Steps S9, S10 and S11).

Next, a judgement is made as to whether or not the value of the state variable (speed deviation) Suf is not less than 0 (Step S12). When the state variable Suf is zero or positive, the switching input τ1 is set to be equal to the predetermined maximum value Dismax the miscellaneous disturbance. On the other hand, when the state variable Suf is negative, the switching input τ1 is set to be equal to the predetermined minimum value Dismin of the miscellaneous disturbance (Steps S13, S14).

Subsequently, the torque command τ is calculated in accordance with the equation (23) on the basis of the value sin θ relating to the robot arm angle θ, the command acceleration r', the torque command value Tcmd obtained in the PI control, respective estimated values J*, A*, Gr*, Cf*, the switching input τ1, and the actual speed y (Step S15). The processor supplies this torque command τ to an electric current loop processing (Step S16), and finish the whole control procedure.

Hereinafter, this control procedure defined by the above steps S1 to S16 is executed at a predetermined cycle to drive the servomotor 24. Although in the above embodiment, the switching input τ1 of the sliding mode is added to the torque command τ, it will not be necessary to add the switching input τ1 to the torque command in the case where the robot has only one axis, or in the case where the robot has more than one axis, but the effect of the gravity is given from only one robot arm and the effect of the gravitational disturbance based on the rotational angle of the robot arm is taken into consideration with estimated value Gr* so that estimation of other disturbances is unnecessary. Furthermore, in the case where not less than two axes receive the effect of the gravitational disturbance due to angle of the robot arms, it is possible to obtain the above-described estimated value Gr* for each of these two axes, though it is possible to execute the processing of the above-described embodiment.

In the control procedure as shown in FIG. 5, the steps S3–S5, S7–S11 and S15 are not included in the conventional PI control and, therefore, those steps are peculiar to the adaptive PI control of the present invention. Moreover, the steps S12–S14 are necessary when the sliding mode is jointly used.

Still further, although the above embodiment shows a robot as a control object, it is needless to say that the present invention can be applied to other apparatus, such as a machine tool. Yet further, although the above embodiment shows a servomotor executing the position and speed control, the present invention is can be applied to a motor executing the speed control only.

We claim:

1. An adaptive proportional-plus-integral control method for a motor control system including a proportional-plus-integral loop as a speed loop, comprising the steps of:

determining a torque command τ to be supplied to a motor in accordance with the following equation on the basis of an equation of motion $$\tau = K2 \cdot Suf + J^* \cdot r' + A^* \cdot y + Gr^* \cdot \sin\theta + Fr^* + Cf^* + \tau 1 \text{ and;}$$

obtaining terms of K2·Suf and Fr* of the above equation as proportional and integral terms of an ordinary proportional-plus-integral control, wherein K2 represents a proportional constant, Suf represents a speed deviation obtained by subtracting an actual motor speed from a speed command, r' represents a differential of the speed command with respect to time which is a command acceleration, J*, A*, Gr*, Fr*, and Cf* represent estimated values of inertia, coefficient of dynamic friction, coefficient of gravitational disturbance, constant gravitational disturbance, and Coulomb's friction, respectively, and θ represents a rotational angle of a robot arm which will give the greatest effect on the gravitational disturbance, and wherein the estimated value J* of the inertia is obtained by integrating the value obtained by multiplying the speed deviation Suf by the command acceleration r' and a reciprocal (1/α) of an adjusting parameter α determining an adaptive speed with respect to time, the estimated value A* of the coefficient of dynamic friction is obtained by integrating the value obtained by multiplying the speed deviation Suf by the actual motor speed y and a reciprocal (1/β) of an adjusting parameter β with respect to time, the estimated value Gr* of the coefficient of gravitational disturbance is obtained by integrating the value obtained by multiplying the speed deviation Suf by sin θ corresponding to a rotational angle θ of said arm and a reciprocal (1/γ) of an adjusting parameter γ with respect to time, the estimated value Fr* of the constant gravitational disturbance is obtained by integrating the value obtained by multiplying the speed deviation Suf by a reciprocal (1/δ) of an adjusting parameter δ with respect to time, the estimated value Cf* of the Coulomb's friction is obtained by integrating the value obtained by multiplying the speed deviation Suf by a reciprocal (1/ε) of an adjusting parameter ε with respect to time, and the switching input τ1 is determined to be a maximum value of gravitational disturbances given by rotational angles of arms other than said robot arm which will give the greatest effect on said gravitational disturbance when said speed deviation Suf is zero or positive, and is determined to be a minimum value of the gravitational disturbances when said speed deviation Suf is negative.

2. An adaptive proportional-plus-integral control method for a motor control system in accordance with claim 1, wherein said switching input τ1 is always zero.

3. An adaptive proportional-plus-integral control method for a motor control system of a control object including a proportional-plus-integral loop as a speed loop, comprising the steps of:

obtaining a speed deviation by subtracting an actual motor speed of a motor from a motor speed command;

defining said speed deviation as a state variable for equalizing the actual motor speed to the motor speed command;

defining a plurality of values of parameters of said control object;

determining a plurality of estimated values respectively corresponding to said plurality of values of parameters; and determining an actual torque command, for input to the motor, based on an equation of motion of said control object which converges said state variable to zero and which converges said plurality of estimated values to said plurality of values of parameters.

4. An adaptive proportional-plus-integral control method for a motor control system in accordance with claim 1, wherein said plurality of parameters include inertia, coefficient of dynamic friction, gravitational disturbance, and Coulomb's friction.

5. An adaptive proportional-plus-integral control method for a motor control system of a control object including a proportional-plus-integral loop as a speed loop, comprising the steps of:

obtaining a speed deviation by subtracting an actual motor speed of a motor from a motor speed command;

defining said speed deviation as a state variable;

estimating values of a plurality of parameters which will affect characteristics of said control object to be controlled by said motor, using said state variable;

obtaining a torque correction value to cancel an error between each of said plurality of estimated values and each of corresponding actual values of said plurality of parameters; and adding said torque correction value to a first torque command obtained through a processing of said proportional-plus-integral loop, thereby producing a second torque command to be supplied to said motor for driving.

6. An adaptive proportional-plus-integral control method in accordance with claim 5, wherein said plurality of parameters include inertia, coefficient of dynamic friction, and gravitational disturbance of said control object.

7. An adaptive proportional-plus-integral control method in accordance with claim 6, wherein said plurality of parameters further include Coulomb's friction.

8. An adaptive proportional-plus-integral control method in accordance with claim 7, wherein the step of estimating said gravitational disturbance of said plurality of parameters includes the step of estimating a coefficient of a gravitational disturbance which will determine a disturbance depending on a position of said control object and constant gravitational disturbances other than said coefficient of gravitational disturbance.

9. An adaptive proportional-plus-integral control method in accordance with claim 6, wherein said control object is a robot, and the step of estimating said gravitational disturbance of said plurality of parameters includes the step of estimating a coefficient of gravitational disturbance relating to an angle of an arm of said robot which will receive the greatest effect of gravity, disturbances determined by angles of arms other than said arm, and a constant gravitational disturbance.

* * * * *